(12) United States Patent
Pugaczewski

(10) Patent No.: US 9,203,729 B2
(45) Date of Patent: Dec. 1, 2015

(54) REMOTE MONITORING A LAYER 2 VIRTUAL PRIVATE NETWORK

(71) Applicant: CenturyLink Intellectual Property LLC, Denver, CO (US)

(72) Inventor: John T. Pugaczewski, Hugo, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 112 days.

(21) Appl. No.: 13/787,993

(22) Filed: Mar. 7, 2013

(65) Prior Publication Data

US 2014/0254395 A1    Sep. 11, 2014

(51) Int. Cl.
*H04L 12/26* (2006.01)
*H04L 12/46* (2006.01)
*H04L 12/723* (2013.01)

(52) U.S. Cl.
CPC ............. *H04L 43/50* (2013.01); *H04L 12/46* (2013.01); *H04L 45/50* (2013.01); *H04L 43/18* (2013.01)

(58) Field of Classification Search
CPC .................................................... H04L 43/10
USPC ................................................ 370/250, 251
See application file for complete search history.

(56) References Cited

U.S. PATENT DOCUMENTS

| | | | |
|---|---|---|---|
| 7,990,852 B1* | 8/2011 | Cirkovic et al. | 370/228 |
| 8,175,078 B2* | 5/2012 | Voit et al. | 370/351 |
| 8,175,112 B1* | 5/2012 | Johnson et al. | 370/468 |
| 8,331,243 B2* | 12/2012 | Mohan et al. | 370/241.1 |
| 8,427,939 B2* | 4/2013 | Sato | 370/225 |
| 8,483,229 B2* | 7/2013 | Mohan et al. | 370/395.5 |
| 8,504,727 B2* | 8/2013 | Mohan et al. | 709/249 |
| 8,711,713 B2* | 4/2014 | Parker et al. | 370/250 |
| 8,718,057 B1* | 5/2014 | Rabie et al. | 370/390 |
| 8,724,452 B2* | 5/2014 | Nakash | 370/218 |
| 8,917,731 B2* | 12/2014 | Mohan et al. | 370/395.5 |
| 8,948,032 B1* | 2/2015 | Sampath | 370/252 |
| 2008/0225853 A1* | 9/2008 | Melman et al. | 370/392 |
| 2009/0080338 A1* | 3/2009 | Parker et al. | 370/250 |
| 2013/0322236 A1* | 12/2013 | Bahadur et al. | 370/230 |

* cited by examiner

*Primary Examiner* — Edan Orgad
*Assistant Examiner* — Emmanuel Maglo
(74) *Attorney, Agent, or Firm* — Swanson & Bratschun, L.L.C.

(57) ABSTRACT

Novel tools and techniques that enable remote network monitoring, and in particular cases, remote monitoring of traffic on a L2VPN. In a particular aspect, tools enable a vendor-independent remote monitoring capability by allowing a port on to be spanned (mirrored) to a virtual local area network attachment circuit at two different provider edge devices. Such embodiments can allow test equipment located at one provider edge device to perform monitoring at another provider edge device without regard to conflicting monitoring protocols, interfaces, and/or the like.

22 Claims, 4 Drawing Sheets

REMOTE MONITORING A LAYER 2 VIRTUAL PRIVATE NETWORK

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to virtual private networks and more particularly, to solutions for monitoring diverse virtual private networks.

BACKGROUND

Internet service providers often employ a Layer 2 virtual private network ("L2VPN") to provide private transport services from one customer site to another. A typical L2VPN uses multi-protocol label switching ("MPLS") labels to route traffic between one provider edge ("PE") device to another PE device. In order to meet service level agreements and to ensure that customer traffic is communicated properly, a provider often desires to monitor the traffic on a L2VPN. In some cases, it may be useful to monitor the traffic flow at one PE device from test equipment attached to the other PE device.

A common troubleshooting technique for monitoring such traffic is to monitor a port on one of the PE devices and send the transmitted and/or received traffic to a second port that is connected to a protocol analyzer or other test equipment. In the scenario where the port being monitored and the monitoring port are on the same router (or other device), or even when both edge devices are the same type of router, a standards-defined approach is not an issue, and vendor-proprietary monitoring techniques can be sufficient. However, in the scenario of a multi-vendor network, where the monitored port and port used for test equipment are on different devices there is no standard protocol or mechanism to provide for such monitoring. In such cases, there currently exists no known solution to allow remote monitoring of network traffic, especially in the case of a L2VPN, which is designed to prevent intermediate traffic inspection between the endpoints of the VPN. Hence, there is a need for more robust network monitoring solutions, and in particular solutions that can be used in the context of a L2VPN.

BRIEF SUMMARY

One set of embodiments provides tools and techniques that enable remote network monitoring, and in particular embodiments, remote monitoring of traffic on a L2VPN. In a particular aspect, some embodiments enable a vendor-independent remote monitoring capability by allowing a port on to be spanned (mirrored) to a virtual local area network ("VLAN") attachment circuit ("AC") at both PE devices. Such embodiments can allow test equipment located at one PE device to perform monitoring at another PE device without regard to conflicting monitoring protocols, interfaces, and/or the like. Certain embodiments can also allow monitoring, from one PE device, of a user PE device having an attachment circuit to a second PE device. In an aspect of certain embodiments, deployment of a pseudo wire between the two PE devices can provide this ability; in an aspect this pseudo wire might be separate from a pseudo wire that is used to carry customer traffic between the PE devices.

In addition, using a pseudo wire edge-to-edge emulation ("PWE3") technique, some embodiments allow the respective ACs to be associated with two uni-directional label-switched paths ("LSP") and a corresponding Martini Pseudo Wire.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

Merely by way of example, one set of embodiments provides methods, including without limitation methods of monitoring Layer 2 traffic on a L2VPN. In one aspect, such a method can comprise providing a subscriber pseudo wire over a first packet switched network tunnel between a first subscriber attachment circuit at a first provider edge device and a second subscriber attachment circuit at a second provider edge device. In another aspect, the subscriber pseudo wire can traverse a L2VPN between the first provider edge device and the second provider edge device and/or can provide communication to transmit subscriber traffic between the first subscriber attachment circuit and the second subscriber attachment circuit. In a set of embodiments, the first provider edge device might employ a first set of monitoring protocols and the second provider edge device might employ a second set of monitoring protocols. In a particular aspect, the first set of monitoring protocols might not be compatible with the second set of monitoring protocols, such that the first provider edge device cannot be monitored directly from the monitoring port of the second provider edge device.

The method can further comprise creating a monitoring pseudo wire, over a second packet switched network tunnel (which might be the same packet switched network tunnel as the first packet switched network tunnel, or might be different), between a first monitoring attachment circuit at the first provider edge device and a second monitoring attachment circuit at the second provider edge device. In an aspect, the monitoring pseudo wire might be separate from the subscriber pseudo wire. Merely by way of example, the monitoring pseudo wire and the subscriber pseudo wire might be separate pseudo wires established over the same packet switched network tunnel or different packet switched network tunnels. In some cases, the monitoring attachment circuits might be VLAN attachment circuits.

The method might further comprise providing communication, over the second pseudo wire connection, between the first provider edge device and test equipment (which can include, merely by way of example, a protocol analyzer and/or any other suitable equipment). In an aspect, the test equipment might be coupled, via the second monitoring attachment circuit, with a monitoring port of the second provider edge device.

The method might further comprise monitoring, with the test equipment coupled with the monitoring port of the second provider edge device, traffic ingressing and egressing the first subscriber attachment circuit. In some cases, the monitoring pseudo wire might comprise two uni-directional label-switched paths between the first provider edge device and the second provider edge device, and/or the test equipment might employ only one of the uni-directional LSP to monitor traffic ingressing and egressing the first subscriber attachment circuit.

In a particular set of embodiments, the L2VPN might further provides communication with a user provider edge device in communication with the first provider edge device over the first subscriber attachment circuit. In such embodiments, monitoring traffic ingressing and egressing the first subscriber attachment circuit might comprise monitoring the traffic at the user provider edge device with the test equipment. Merely by way of example, the user provider edge device might communicate with the first provider edge device over an VLAN that provides VLAN tagging (such as an IEEE 802.1Q VLAN, to name one example), and in a particular aspect, the VLAN might be mapped to a Q-in-Q interface between the first provider edge device and the user provider edge device over the VLAN. The method might further comprise configuring the user provider edge device to monitor traffic on the first subscriber attachment circuit and to transmit monitored port data over the mapped VLAN.

Another set of embodiments provides systems, including in particular, systems for monitoring Layer 2 traffic on a L2VPN remotely. One such system might comprise a first provider edge device in communication with a first subscriber attachment circuit and a second provider edge device in communication a second subscriber attachment circuit. The system might further comprise a subscriber pseudo wire providing communication to transmit subscriber traffic between the first subscriber attachment circuit and the second subscriber attachment circuit over a first packet switched network tunnel. In an aspect, the subscriber pseudo wire might traverse a L2VPN between the first provider edge device and the second provider edge device and/or might provide communication between the first subscriber attachment circuit and the second subscriber attachment circuit.

In a particular set of embodiments, the system might further comprise a monitoring pseudo wire established over a second packet switched network tunnel to provide communication between a first monitoring attachment circuit at the first provider edge device and a second monitoring attachment circuit at the second provider edge device. In an aspect, the monitoring pseudo wire might be separate from the subscriber pseudo wire. The system might further comprise test equipment coupled, via the second monitoring attachment circuit, with a monitoring port of the second provider edge device. The second pseudo wire connection might provide communication between the first provider edge device and the testing equipment. In some cases, the testing equipment can be configured to monitor traffic ingressing and egressing the first subscriber attachment circuit.

In some embodiments, the L2VPN further provides communication with a user provider edge device in communication with the first provider edge device over the first subscriber attachment circuit. In such cases, monitoring traffic ingressing and egressing the first subscriber attachment circuit can comprise monitoring the traffic at the user provider edge device with the test equipment. In particular embodiments, the user provider edge device is configured to monitor traffic on the first subscriber attachment circuit and/or to transmit monitored port data to the test equipment (e.g., over the mapped VLAN and/or the monitoring pseudo wire).

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
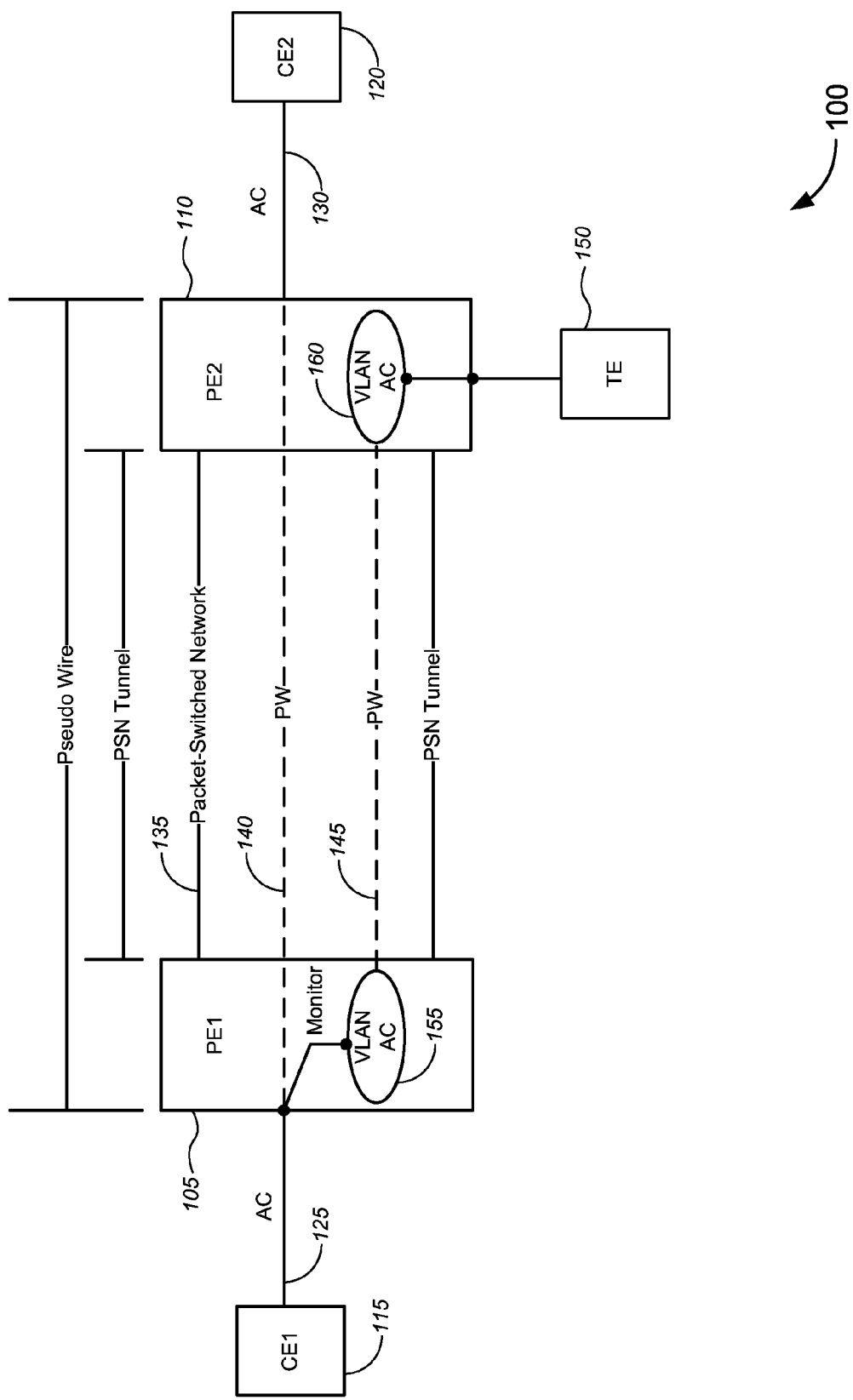
FIG. 1 is a block diagram illustrating a system for remote monitoring, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

One set of embodiments provides tools and techniques that enable remote network monitoring, and in particular embodiments, remote monitoring of traffic on a L2VPN. In a particular aspect, some embodiments enable a vendor-independent remote monitoring capability by allowing a port on to be spanned (mirrored) to a virtual local VLAN attachment circuit AC at both PE devices. Such embodiments can allow test equipment located at one PE device to perform monitoring at another PE device without regard to conflicting monitoring protocols, interfaces, and/or the like. Certain embodiments can also allow monitoring, from one PE device, of a user PE device having an AC to a second PE device. In an aspect of certain embodiments, deployment of a pseudo wire between the two PE devices can provide this ability; in an aspect this pseudo wire might be separate from a pseudo wire that is used to carry customer traffic between the PE devices.

In addition, using a pseudo wire edge-to-edge emulation ("PWE3") technique, some embodiments allow the respective ACs to be associated with two uni-directional label-switched paths ("LSP") and a corresponding Martini Pseudo Wire. In some cases, the monitoring technique might employ only one of these LSP (e.g., to transport monitoring traffic from the monitored PE device to the other PE device, to which the test equipment is attached). The other LSP can be used as desired (e.g., to transmit control signaling, other data, etc.).

To illustrate features of one set of embodiments, we turn to FIG. 1, which illustrates a system 100 that provides remote monitoring over a L2VPN. The system 100 comprises a first PE device 105 in communication with a second PE device 110. The PE devices 105, 110 typically will operated by a telecommunication service provider (e.g., an Internet service provider ("ISP") and often will be located at different provider locations (e.g., central offices, points of presence, data centers, etc.) and will provide communication for customer equipment 115, 120, respectively, as shown in FIG. 1. Customer equipment can be any sort of networking equipment or computers that is operated by subscribers of the telecommunication service provider, and for purposes of this example, one set of customer equipment 115 might be located at a first subscriber location (e.g., a first business office of a subscriber) and another set of customer equipment 120 might be located at a second subscriber location (e.g., a second business office) which can be located anywhere but is often remote from the first subscriber location.

In many cases, customer equipment 115 will comprise a customer edge ("CE") device, which can include a router, switch, and/or bridge that serves a local area network ("LAN") or plurality of LANs at the first customer location and thereby provides connectivity between the respective PE device 105 and the other computing devices on that LAN or LANs. In this way, for example, the PE device 105 can provide connectivity with the telecommunication service provider's core network, the Internet, etc. Similarly, some customer equipment 120 at the second subscriber location can serve one or more LANs (and devices thereon), and the second PE device 110 can provide connectivity between the customer equipment 120 (and the other devices served thereby) and the provider's core network, the Internet, etc.

In a set of embodiments, the system 100 comprises a first attachment circuit ("AC") 125 that is in communication with (and provides communication between) the first PE device 105 and the first customer equipment 115, as well as a second AC 130 that is in communication with (and provides communication between) between the second PE device 110 and the second customer equipment 120. The term "attachment circuit," is used herein generically to describe any suitable mechanism of providing communication between customer equipment (such as a router) and a PE device. An attachment circuit may comprise a connection that is usually thought of as a "data link", or it may be a tunnel of some sort. One example of an attachment circuit is an Ethernet link.

The first PE device 105 and the second PE device 110, then, can be in communication over a packet-switched network 135, which might comprise the provider's core network, the Internet, other peer networks, and/or the like. In many embodiments, the packet-switched network will be an Internet Protocol-based network. In a particular aspect, the PE devices 105, 110 can provide communication between the respective customer equipment 115, 120, for example, to allow data traffic between two subscriber sites. In a particular embodiment, the provider might established a packet-switched network ("PSN") tunnel 135 between the two PE devices 105, 110, to establish a L2VPN between the two PE devices 105, 110. The provider can then establish a subscriber pseudo wire 140 to traverse L2VPN between the two PE devices 105, 110. This subscriber pseudo wire can transmit traffic between the first AC 125 and the second AC 130 to provide a virtual circuit for secure communication between the respective customer equipment 115, 120.

As used herein, the term "pseudo wire" can mean a Martini Pseudo Wire as known in the art. More generally, a pseudo wire, as that term is used herein, can be any connection that emulates the operation of a physical, point-to point wire carrying service between two endpoints. The service being carried over the pseudo wire may be ATM, Frame Relay, Ethernet, time-division multiplexing ("TDM"), or any other suitable service; the packet-switched network can employ Multi-protocol Label Switching ("MPLS"), Internet Protocol (IPv4 or IPv6), or Layer 2 Tunneling Protocol Version 3 ("L2TPv3") or any other suitable Layer 2 networking technique. In a particular aspect, a pseudo wire in accordance with various embodiments, a pseudo wire edge-to-edge emulation ("PW3") technique can be used to allow the pseudo wire to span any connection between the two PE devices 105, 110, irrespective of the network topology between the two PE devices (so long as that topology supports a PSN tunnel that can be traversed by the pseudo wire.

Those skilled in the art will appreciate that the provider often will want to monitor traffic over the L2VPN between the customer equipment 115, 120, e.g., to detect service degradation, meet service level agreements, and/or the like. If you possible strategies exist for such monitoring. Merely by way of example, the provider might have a monitoring port on the second PE device 110, and this port can be used to monitor traffic traversing that second PE device 110. However, the provider's ability to monitor traffic at the first PE device 105 is limited. For example, the provider might be able to attach test equipment directly to the first provider edge device 105 (similar to the way the equipment could be attached to the second PE device 110; in some cases, however, this option might be infeasible (due to inaccessibility of the PE device 105, etc.). Moreover, even if the attachment of test equipment to the first PE device 105 were feasible, it still would be advantageous if the provider could monitor both ends of the pseudo wire 140 from a single location. In a multi-vendor environment, however, there currently is no way to perform this task.

Some embodiments, therefore, feature a monitoring pseudo wire 145, which is separate from the subscriber pseudo wire 140 carrying the subscriber's traffic, to support test equipment 150 attached to the first PE device 110. This monitoring pseudo wire 145 can be established over a PSN tunnel (which might be the same PSN tunnel traversed by the subscriber pseudo wire 145 might be a separate tunnel, which can traverse the same or a different path through the network between the PE devices 105, 110). In such embodiments, the provider might establish a monitoring AC 155 at the first PE device 105 and a second monitoring AC 160 at the second PE device 110.

In some embodiments, the monitoring ACs 155, 160 might be VLAN ACs. Merely by way of example, these ACs might be configured in accordance with IEEE 802.11Q to establish a VLAN as specified by that standard. In this respect, the pseudo wire 145 can establish a separate VLAN between the PE devices 105, 110 thorough these VLAN ACs 155, 160. This VLAN can be used to support monitoring operations. In one aspect, the monitoring pseudo wire 145 might comprise a pair of uni-directional LSPs, to establish a round-trip pseudo wire. The monitoring operations, however, might require only one of these LSPs (i.e., the path from the first PE device 105 to the second PE device 110) to carry monitoring traffic. Hence, the other LSP (the return path from the second PE device 110 to the first PE device 105) can be used for a variety of other purposes. Merely by way of example, the LSP from the second PE device 110 to the first PE device 105 can be used for control signaling, to carry other traffic (including, but not limited to, subscriber traffic), and/or the like. Or, in some embodiments, this LSP might remain unused or reserved for future use (e.g., as a backup route between the PE devices 105, 110).

The AC 160 at the second PE device 110 can be used to couple test equipment 150 to a monitoring port on the second PE device 110. Such test equipment can include, without limitation, protocol analyzers and the like. In an aspect of some embodiments, the test equipment 150 can be configured to monitor traffic ingressing and/or egressing the first PE device 105. Merely by way of example, the monitored traffic on the subscriber pseudo wire 140 at the first PE device 105 can be mirrored to a port assigned to the monitoring AC 155 at the first PE device 105. This mirrored traffic then can be transmitted to the test equipment 150 over the monitoring AC 155, across the monitoring pseudo wire 145, and through the monitoring AC 160, where it can be received any analyzed by the test equipment 150. Alternatively and/or additionally, data about the traffic ingressing and/or egressing the first PE device 105 can be transmitted along this path to the test equipment 150. In this way, the system 100 can provide non-intrusive monitoring of the traffic at the first PE device 105, because the monitoring traffic itself is not carried on the subscriber pseudo wire 140 and therefore does not interfere with measurement or analysis of the subscriber traffic itself. At the same time, however, a single set of test equipment, attached to the second PE device 110, can be used to monitor traffic at both PE devices 105, 110, reducing equipment cost and administrative overhead.

Figure 2:
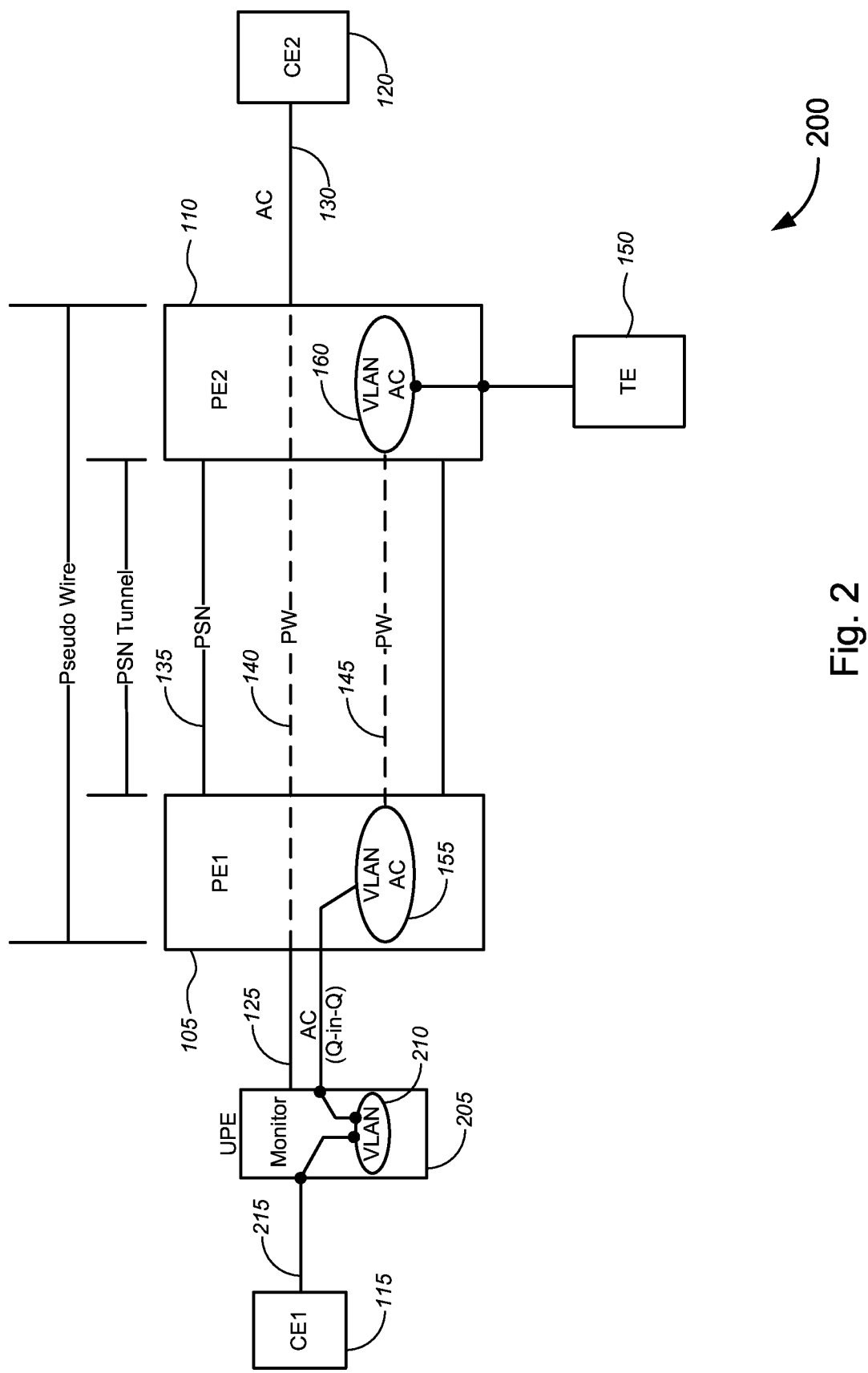
FIG. 2 is a process flow diagram illustrating a method of remote monitoring in accordance with various embodiments.

Other embodiments provide variations on this arrangement. Merely by way of example, FIG. 2 illustrates a system 200 that functions similarly to the system 100 described above. The system 200 of FIG. 2, however, also includes a user PE device 205. The user PE device 205, which might be located at the subscriber location to provide an interface between the PE device 105 and the customer equipment 115, might feature an AC 210 that provides communication with the PE device 105. In this embodiment, the provider might need the ability to monitor not only traffic at the first PE device 105, but also traffic at the user PE device 205. Accordingly, in this embodiment, the first subscriber AC 125 provides communication between the first PE device 105 and the user PE device 205, which then provides communication with the customer equipment 115 (e.g., a customer edge device) via an AC 215 or other data link.

The subscriber AC 125 might be implemented as an IEEE 802.11Q VLAN that provides VLAN tagging. The user PE device 205, then, might be configured to establish a VLAN 210 for carrying monitoring traffic, which can be mapped to a Q-in-Q interface (also known as the IEEE 802.11 ad standard), which supports "stacked" VLAN tags. (In this way, for example, some embodiment allow the user PE device 205 can use the same physical connection, but a different logical connection, with the PE device 105 to transport the monitoring traffic and the traffic being monitored.) The user PE device 205, then, can be configured with a monitor to send the traffic (or data about the traffic) ingressing and/or egressing the monitored port (e.g., the port to which the subscriber AC 125 is attached) to the internally defined monitoring VLAN 210. This VLAN 210 can be mapped to the Q-in-Q interface for the subscriber AC 125 that connects the user PE device 205 and the first PE device 105. The monitoring traffic, then, can be tagged with the VLAN tag of the monitoring AC 155 at the first PE device; this traffic can be carried over the subscriber AC 125 and, and the first PE device, routed onto the monitoring AC 155 for transport over the monitoring pseudo wire 145, as described above, and ultimately to the test equipment 150 for monitoring and/or analysis. In this way, certain embodiments can also be used to monitor a user PE device remotely.

Figure 3:
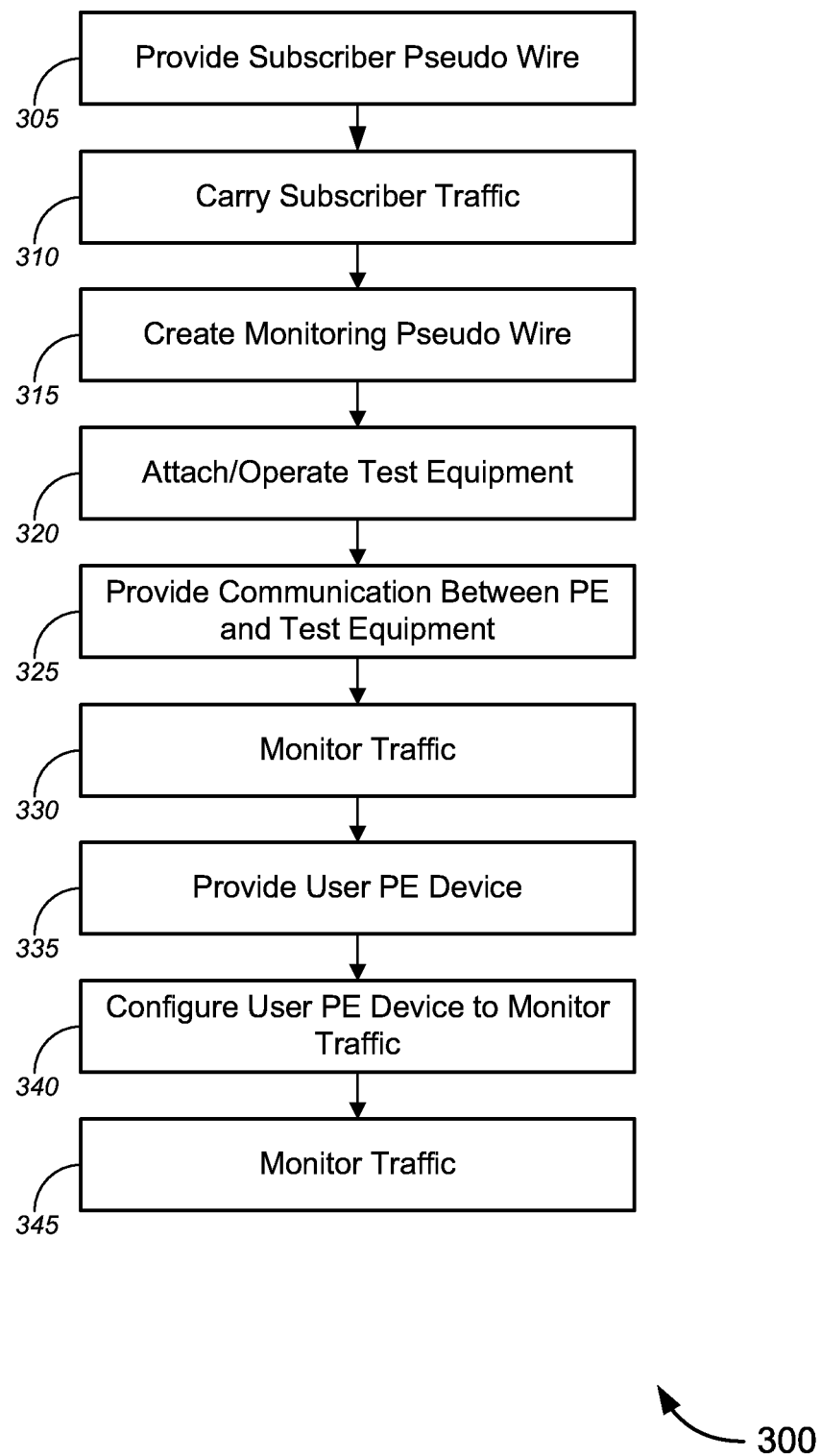
FIG. 3 is a generalized schematic diagram illustrating a computer system, in accordance with various embodiments.

FIG. 3 illustrates a method 300 of monitoring a L2VPN remotely, which can be implemented in a system such as the systems 100 and 200 described above. While the techniques and procedures are depicted and/or described in a certain order for purposes of illustration, it should be appreciated that certain procedures may be reordered and/or omitted within the scope of various embodiments. Moreover, while the methods illustrated by FIG. 3 can be implemented by (and, in some cases, are described below with respect to) the systems 100 and 200 of FIGS. 1 and 2, respectively (or components thereof), these methods may also be implemented using any suitable hardware implementation. Similarly, while the systems 100 and 200 of FIGS. 1 and 2 (and/or components thereof) can operate according to the methods illustrated by FIG. 3 (e.g., by executing instructions embodied on a computer readable medium), the systems 100 and 200 can also operate according to other modes of operation and/or perform other suitable procedures.

The method 300, in some embodiments, comprises providing a subscriber pseudo wire (block 305). In some embodiments, this subscriber pseudo wire might be provided over a first PSN tunnel between a first subscriber AC at a first PE device and a second subscriber AC over a second PE device (as illustrated by FIGS. 1 and 2, for example) to traverse a L2VPN between the first PE device and the second PE device. As shown at block 310, this subscriber pseudo wire can be used to carry subscriber traffic (i.e., traffic produced or consumed by the subscriber, for the subscriber's purposes).

The method 300 can also comprise creating a monitoring pseudo wire (block 315), which can be used to carry monitoring traffic (e.g., subscriber traffic that has been mirrored for monitoring purposes, statistics about subscriber traffic, etc.) from the first PE device to the second PE device. In some aspects, the monitoring pseudo wire might be established over a second PSN tunnel (which can be the same or different from the first PSN tunnel traversed by the subscriber pseudo wire). In either case, however, the monitoring pseudo wire can be separate from the subscriber pseudo wire; this can avoid impacting performance of the subscriber pseudo wire (which could both affect the effectiveness of the monitoring and negatively impact the subscriber).

At block 320, the method 300 comprises attaching (and/or operating test equipment attached) to the first PE device. In an aspect, the test equipment is attached to the first PE device with monitoring AC, which can comprise a VLAN AC. As noted above, a variety of test equipment can be attached and/or operated in accordance with various embodiments; merely by way of example, such test equipment can include a protocol analyzer. In an aspect, the test equipment can be attached to a monitor port of the second PE device (and the monitoring AC can be established on this port).

The method 300 can further comprise providing communication (e.g., over the monitoring pseudo wire) between the test equipment and the first PE device (which is remote from the test equipment). The test equipment then can be used to monitor traffic at the first PE device (block 325), for example, by monitoring traffic ingressing and/or egressing the first PE device on the port to which the subscriber pseudo wire is assigned. This traffic, for example, can be mirrored to the port at the first PE device to which the AC for the monitoring pseudo wire is assigned, and from there, the mirrored traffic can be transported over the monitoring pseudo wire and routed through the monitor port of the second PE device to the test equipment, which can monitor the traffic using whatever techniques are supported by the test equipment.

In some cases, the method 300 might include providing a user PE device (block 335), which, as illustrated by FIG. 2 and described above, can be in communication with the first PE device via a VLAN over an AC (among other techniques). In accordance with some embodiments, providing a user PE device can comprising installing a user PE device at a subscriber location, and/or providing communication (e.g., via a L2VPN) with a user PE device at a subscriber location (or elsewhere). In such embodiments, the method 300 (and more, particularly, the monitoring operations performed in accordance with the method) can also comprise monitoring traffic at the user PD device with the test equipment.

Merely by way of example, at block 340, the method 300 might comprise configuring the user PE device to monitor traffic ingressing and/or egressing the user PE device (and/or more particularly, the port to which the subscriber AC with the first PE edge device is assigned), and/or to mirror such monitored traffic to another port (and/or more particularly, the port to which the monitoring AC is assigned). Thereafter, such mirrored traffic can be transmitted over the monitoring PE (as described above) and can be monitored remotely by the test equipment attached to the second PE device.

One advantage of this technique is that, even if the first and second PE devices and the user PE device are all manufactured by separate vendors, the disclosed technique can allow remote monitoring despite any incompatibilities. Hence, for example, the first PE device might employ a first set of monitoring protocols (e.g., protocols provided by Cisco™ routers, and the second PE device (or user PE device) might support a second set of monitoring protocols (e.g., those provided by Juniper Networks™ routers). In such cases, the first set of monitoring protocols might not be compatible with the second set of monitoring protocols. In this case, the first PE device (and/or the user PE device) cannot be monitored directly from the monitoring port of the second PE device, but the disclosed technique will still allow such monitoring, because it allows for mirroring traffic from a remote PE device across a second pseudo wire.

Figure 4:
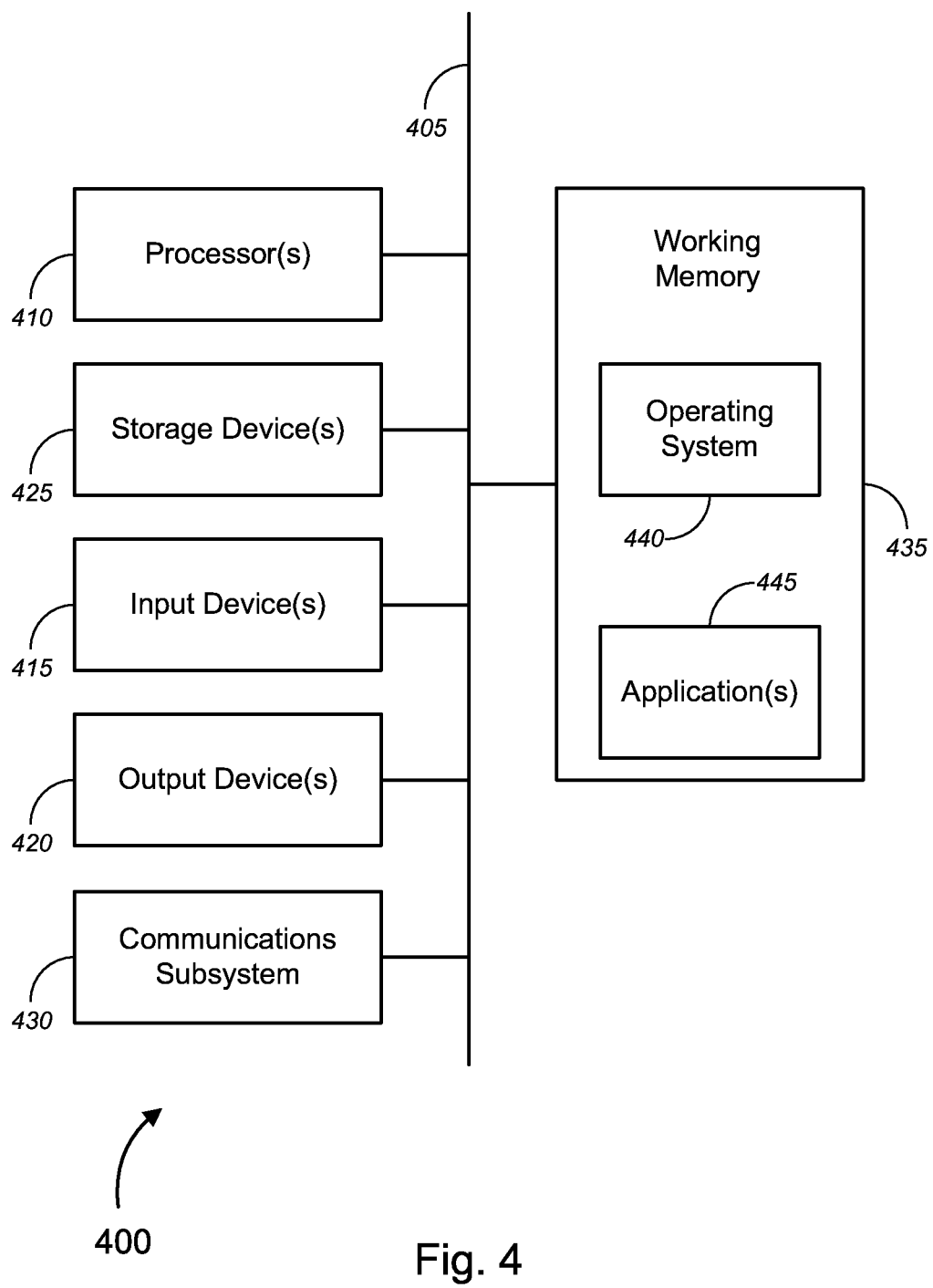
FIG. 4 is a block diagram illustrating a networked system of computers, which can be used in accordance with various embodiments.

FIG. 4 provides a schematic illustration of one embodiment of a computer system 400 that can perform the operations in accordance methods provided by various other embodiments, as described herein, and/or can function as a PE device, customer equipment, test equipment, and/or the like It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of monitoring Layer 2 traffic on a virtual private network ("L2VPN"), the method comprising:
providing a subscriber pseudo wire over a first packet switched network tunnel between a first subscriber attachment circuit at a first provider edge device and a second subscriber attachment circuit at a second provider edge device, the subscriber pseudo wire traversing a L2VPN between the first provider edge device and the second provider edge device and providing communication to transmit subscriber traffic between the first subscriber attachment circuit and the second subscriber attachment circuit;
creating a monitoring pseudo wire, over a second packet switched network tunnel, between a first monitoring attachment circuit at the first provider edge device and a second monitoring attachment circuit at the second provider edge device, the monitoring pseudo wire being separate from the subscriber pseudo wire;

providing communication, over the monitoring pseudo wire, between the first provider edge device and test equipment coupled, via the second monitoring attachment circuit, with a monitoring port of the second provider edge device; and monitoring, with the test equipment coupled with the monitoring port of the second provider edge device, traffic ingressing and egressing the first subscriber attachment circuit.

2. The method of claim 1, wherein the monitoring attachment circuits are virtual local area network ("VLAN") attachment circuits.

3. The method of claim 1, wherein the monitoring pseudo wire comprises two uni-directional label-switched paths ("LSP") between the first provider edge device and the second provider edge device.

4. The method of claim 3, wherein the test equipment employs only one of the uni-directional LSP to monitor traffic ingres sing and egres sing the first subscriber attachment circuit.

5. The method of claim 1, wherein:
the first provider edge device employs a first set of monitoring protocols;
the second provider edge device employs a second set of monitoring protocols; and
the first set of monitoring protocols is not compatible with the second set of monitoring protocols, such that the first provider edge device cannot be monitored directly from the monitoring port of the second provider edge device.

6. The method of claim 1, wherein the L2VPN further provides communication with a user provider edge device in communication with the first provider edge device over the first subscriber attachment circuit, and wherein monitoring traffic ingressing and egressing the first subscriber attachment circuit comprises monitoring the traffic at the user provider edge device with the test equipment.

7. The method of claim 6, wherein the user provider edge device communicates with the first provider edge device over an IEEE 802.1Q virtual local area network ("VLAN") that provides VLAN tagging.

8. The method of claim 7, wherein the VLAN is mapped to a Q-in-Q interface between the first provider edge device and the user provider edge device over the VLAN.

9. The method of claim 6, further comprising:
configuring the user provider edge device to monitor traffic on the first subscriber attachment circuit and to transmit monitored port data over the mapped VLAN.

10. The method of claim 1, wherein the test equipment comprises a protocol analyzer.

11. The method of claim 1, wherein the first packet switched network tunnel is the same as the second packet switched network tunnel.

12. A system for monitoring Layer 2 traffic on a virtual private network ("L2VPN") remotely, the system comprising:
a first provider edge device in communication with a first subscriber attachment circuit;
a second provider edge device in communication a second subscriber attachment circuit;
a subscriber pseudo wire providing communication to transmit subscriber traffic between the first subscriber attachment circuit and the second subscriber attachment circuit over a first packet switched network tunnel, the subscriber pseudo wire traversing a L2VPN between the first provider edge device and the second provider edge device and providing communication between the first subscriber attachment circuit and the second subscriber attachment circuit;

a monitoring pseudo wire established over a second packet switched network tunnel to provide communication between a first monitoring attachment circuit at the first provider edge device and a second monitoring attachment circuit at the second provider edge device, the monitoring pseudo wire being separate from the subscriber pseudo wire; and test equipment coupled, via the second monitoring attachment circuit, with a monitoring port of the second provider edge device, the second pseudo wire connection providing communication between the first provider edge device and the test equipment, the test equipment being configured to monitor traffic ingressing and egressing the first subscriber attachment circuit.

13. The system of claim 12, wherein the monitoring attachment circuits are virtual local area network ("VLAN") attachment circuits.

14. The system of claim 12, wherein the monitoring pseudo wire comprises two uni-directional label-switched paths ("LSP") between the first provider edge device and the second provider edge device.

15. The system of claim 14, wherein the test equipment employs only one of the uni-directional LSP to monitor traffic ingres sing and egres sing the first subscriber attachment circuit.

16. The system of claim 12, wherein:
the first provider edge device employs a first set of monitoring protocols;
the second provider edge device employs a second set of monitoring protocols; and
the first set of monitoring protocols is not compatible with the second set of monitoring protocols, such that the first provider edge device cannot be monitored directly from the monitoring port of the second provider edge device.

17. The system of claim 12, wherein the L2VPN further provides communication with a user provider edge device in communication with the first provider edge device over the first subscriber attachment circuit, and wherein monitoring traffic ingressing and egressing the first subscriber attachment circuit comprises monitoring the traffic at the user provider edge device with the test equipment.

18. The system of claim 17, wherein the user provider edge device communicates with the first provider edge device over an IEEE 802.1Q virtual local area network ("VLAN") that provides VLAN tagging.

19. The system of claim 18, wherein the VLAN is mapped to a Q-in-Q interface between the first provider edge device and the user provider edge device over the IEEE 802.1Q connection.

20. The system of claim 17, wherein:
the user provider edge device is configured to monitor traffic on the first subscriber attachment circuit and to transmit monitored port data over the mapped VLAN.

21. The system of claim 12, wherein the test equipment comprises a protocol analyzer.

22. The system of claim 12, wherein the first packet switched network tunnel is the same as the second packet switched network tunnel.

* * * * *